United States Patent
Chadwell et al.

(10) Patent No.: US 10,895,984 B2
(45) Date of Patent: Jan. 19, 2021

(54) FABRIC ATTACHED STORAGE

(71) Applicant: NETAPP, INC., Sunnyvale, CA (US)

(72) Inventors: Craig Chadwell, Sunnyvale, CA (US); Ricardo Labiaga, Sunnyvale, CA (US); Deepak Kenchammana-hosekote, San Jose, CA (US); Swetha Krishnan, Sunnyvale, CA (US); Gokul Soundararajan, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/577,201

(22) Filed: Sep. 20, 2019

(65) Prior Publication Data
US 2020/0019315 A1    Jan. 16, 2020

Related U.S. Application Data

(63) Continuation of application No. 14/489,077, filed on Sep. 17, 2014, now abandoned.

(60) Provisional application No. 62/018,497, filed on Jun. 27, 2014, provisional application No. 62/018,523, (Continued)

(51) Int. Cl.
*G06F 3/06* (2006.01)
*G06F 9/50* (2006.01)
*H04L 29/08* (2006.01)

(52) U.S. Cl.
CPC ............ *G06F 3/0604* (2013.01); *G06F 3/067* (2013.01); *G06F 3/0653* (2013.01); *G06F 3/0659* (2013.01); *G06F 3/0662* (2013.01); *G06F 3/0665* (2013.01); *G06F 9/5027* (2013.01); *G06F 9/5072* (2013.01); *G06F 2003/0697* (2013.01); *H04L 67/1002* (2013.01); *H04L 67/1008* (2013.01)

(58) Field of Classification Search
CPC .... G06F 3/0604; G06F 3/0653; G06F 3/0659; G06F 3/0662; G06F 3/0665; G06F 3/067; G06F 9/5027; G06F 9/5072; G06F 2003/0697; H04L 67/1002; H04L 67/1008; H04L 47/10
See application file for complete search history.

(56) References Cited

U.S. PATENT DOCUMENTS

| | | |
|---|---|---|
| 6,557,035 B1 | 4/2003 | McKnight |
| 7,194,538 B1 | 3/2007 | Rabe et al. |
| 7,685,269 B1 | 3/2010 | Thrasher et al. |

(Continued)

OTHER PUBLICATIONS

International Search Report for Application No. PCT/US2014/056156 dated Jan. 30, 2015, 6 pages.

(Continued)

*Primary Examiner* — Backhean Tiv
*Assistant Examiner* — Jihad K Boustany
(74) *Attorney, Agent, or Firm* — Klein, O'Neill & Singh, LLP

(57) ABSTRACT

Technology is described for a profile-based lifecycle management for data storage servers. The technology can receive a profile, monitor events emitted by devices of the data storage system, determine based on the monitored events that a device of the storage system matches the indicated condition, and perform the action corresponding to the indicated condition, wherein the action includes managing data stored by the data storage system. The received profile can indicate a condition and an action corresponding to the condition.

21 Claims, 11 Drawing Sheets

Related U.S. Application Data filed on Jun. 27, 2014, provisional application No. 61/878,972, filed on Sep. 17, 2013.

(56) References Cited

U.S. PATENT DOCUMENTS

| | | | |
|---|---|---|---|
| 8,224,993 | B1 | 7/2012 | Brandwine |
| 8,995,277 | B2* | 3/2015 | Anand .................... H04L 45/28 370/237 |
| 2002/0147511 | A1 | 10/2002 | Eryurek et al. |
| 2003/0016624 | A1* | 1/2003 | Bare ........................ H04L 61/10 370/217 |
| 2003/0149763 | A1 | 8/2003 | Heitman et al. |
| 2004/0054656 | A1 | 3/2004 | Leung et al. |
| 2004/0073675 | A1 | 4/2004 | Honma et al. |
| 2004/0243699 | A1 | 12/2004 | Koclanes et al. |
| 2006/0002705 | A1 | 1/2006 | Cline et al. |
| 2006/0029097 | A1 | 2/2006 | McGee et al. |
| 2006/0236056 | A1 | 10/2006 | Nagata |
| 2007/0074076 | A1 | 3/2007 | Imai et al. |
| 2007/0100977 | A1 | 5/2007 | Barry |
| 2007/0118643 | A1 | 5/2007 | Mishra et al. |
| 2009/0164660 | A1 | 6/2009 | Abrams |
| 2009/0235269 | A1 | 9/2009 | Nakajima et al. |
| 2010/0077078 | A1 | 3/2010 | Suit et al. |
| 2010/0114889 | A1 | 5/2010 | Rabii et al. |
| 2010/0125753 | A1 | 5/2010 | Gadher |
| 2010/0277307 | A1 | 11/2010 | Horton et al. |
| 2011/0134894 | A1 | 6/2011 | Stacey |
| 2012/0054763 | A1 | 3/2012 | Srinivasan |
| 2012/0079097 | A1 | 3/2012 | Gopisetty et al. |
| 2013/0055290 | A1 | 2/2013 | Gaikwad et al. |
| 2013/0064068 | A1* | 3/2013 | Kamath .............. H04L 12/4604 370/222 |
| 2013/0064096 | A1 | 3/2013 | Degioanni et al. |
| 2013/0086340 | A1 | 4/2013 | Fleming et al. |
| 2013/0144594 | A1 | 6/2013 | Bangalore et al. |
| 2013/0238795 | A1 | 9/2013 | Geffin et al. |
| 2014/0089511 | A1 | 3/2014 | McLean |
| 2014/0278623 | A1 | 9/2014 | Martinez et al. |
| 2014/0280969 | A1* | 9/2014 | Wood .................... H04L 47/125 709/226 |
| 2015/0081836 | A1 | 3/2015 | Kenchammana-Hosekote et al. |
| 2015/0081871 | A1 | 3/2015 | Labiaga et al. |
| 2015/0261630 | A1 | 9/2015 | Endo |
| 2015/0304234 | A1 | 10/2015 | Salle et al. |
| 2016/0149816 | A1* | 5/2016 | Wu ........................ H04L 45/28 370/235 |

OTHER PUBLICATIONS

Wikipedia, "In-band signaling"; Apr. 12, 2018; https://en.wikipedia.org/wiki/In-band_signaling (Year: 2018).

Non-Final Office Action on co-pending US application (U.S. Appl. No. 14/489,212) dated Apr. 8, 2016.

Non-Final Office Action on co-pending US application (U.S. Appl. No. 14/489,253) dated Jun. 10, 2016.

Final Office Action on co-pending US application (U.S. Appl. No. 14/489,212) dated Sep. 1, 2016.

Final Office Action on co-pending US application (U.S. Appl. No. 14/489,253) dated Dec. 1, 2016.

Non-Final Office Action on co-pending US application (U.S. Appl. No. 14/489,212) dated Jan. 3, 2017.

Notice of Allowance on co-pending US application (U.S. Appl. No. 14/489,212) dated May 12, 2017.

Notice of Allowance on co-pending US application (U.S. Appl. No. 14/489,253) dated Oct. 6, 2017.

* cited by examiner

FABRIC ATTACHED STORAGE

CROSS-REFERENCE TO RELATED APPLICATION(S)

This patent application claims priority of and is a continuation of U.S. patent application Ser. No. 14/489,077, filed on Sep. 17, 2014, which claims the benefit of commonly assigned U.S. Provisional Patent Application Ser. No. 61/878,972, filed on Sep. 17, 2013, and entitled "FABRIC-ATTACHED STORAGE SYSTEM"; U.S. Provisional Patent Application Ser. No. 62/018,497, filed on Jun. 27, 2014, and entitled "PROFILE-BASED LIFECYCLE MANAGEMENT FOR DATA STORAGE SERVERS"; and U.S. Provisional Patent Application Ser. No. 62/018,523, filed on Jun. 27, 2014, and entitled "ACTIVELY RESPONDING TO DATA STORAGE TRAFFIC," the disclosures of which are incorporated herein in their entirety by reference.

BACKGROUND

Virtualization is a computing technique used for creating virtual instances of computing devices rather than physical instances of the computing devices. In hardware virtualization, a host computing device is a physical computing device that hosts virtual (or "guest") computing devices. Virtualization has been applied not only to computing devices and operating systems, but also to networking and storage systems.

Cloud computing is a term used to refer to a model of computing in which multiple computing devices provide various computing services via a network, e.g., an Intranet or the Internet. Cloud computing commonly employs virtualization to provide "virtual servers." Enterprises and other entities may use cloud computing instead of deploying data centers or may use cloud computing to provide supplementary "elastic" computing services. Elasticity is a benefit offered by cloud computing in that computing resources can be scaled up or down on the fly without affecting the end user.

Data storage servers, e.g., devices that provide services offered by storage area networks, are increasingly used in private data centers, cloud computing architectures. Moreover, enterprises may have multiple data storage servers (also referred to simply as "storage servers") in their data center and even multiple data centers. System administrators are commonly called on to provide improved storage services, e.g., by adding, maintaining, or retiring storage servers at appropriate times. However, appropriate management at scale can be difficult. For example, it may be difficult to determine how to configure storage servers to respond to storage demands from users, applications, etc.

The sophistication of computing technology has evolved significantly over the last several decades. Various technology now exists for computing, networking, storage, etc. Configuring and managing this technology has also increased in complexity, and system administrators need increasingly sophisticated tools to manage these computing resources in a manner that is optimal for their organizations. These tools can manage device configuration, e.g., to reduce deployment and maintenance costs of data centers.

DETAILED DESCRIPTION

Figure 1:
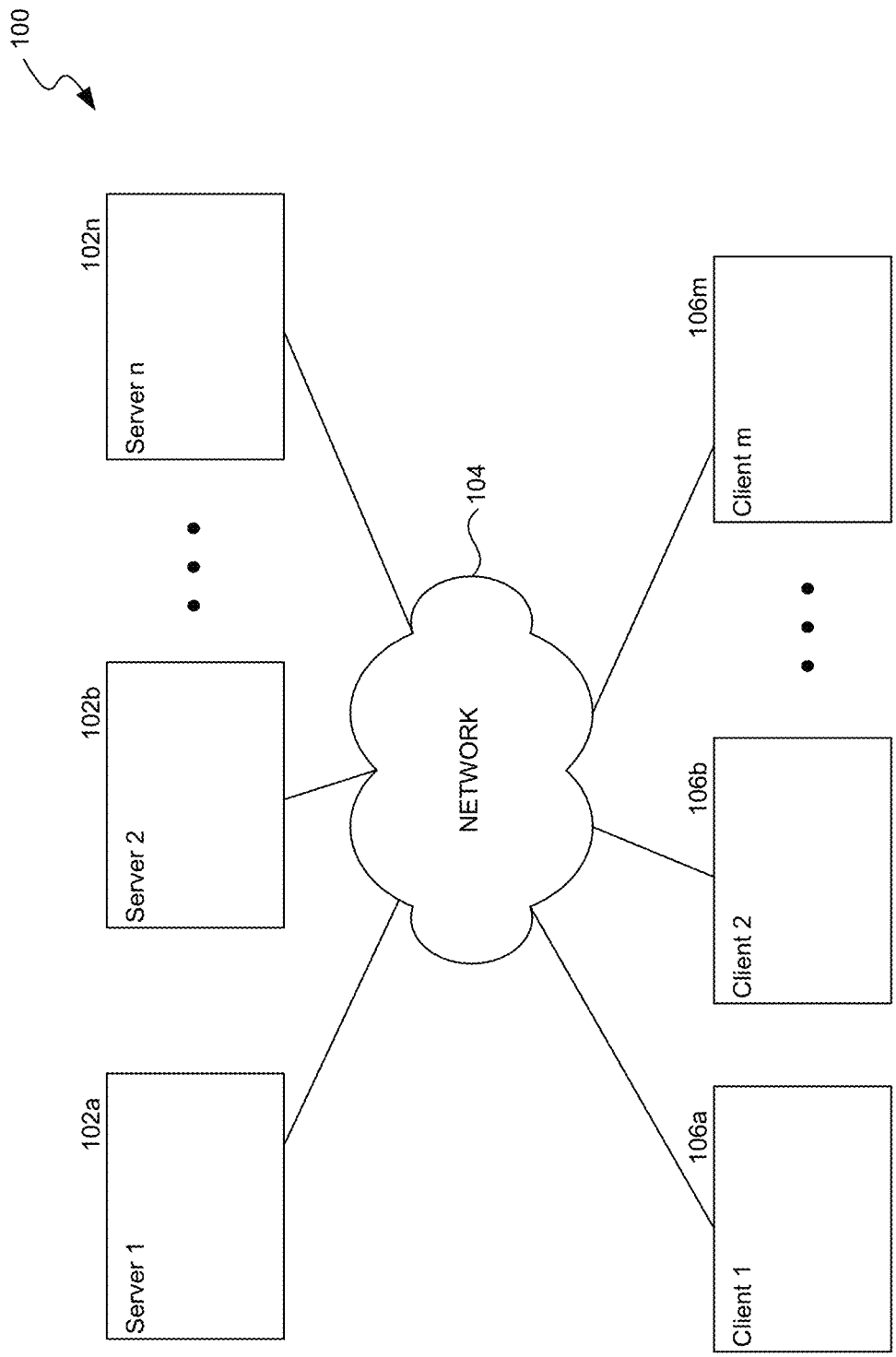
FIG. 1 is a block diagram illustrating various components in an environment in which the disclosed technology may operate in various embodiments.

Profile-based lifecycle management of storage servers and components thereof ("storage devices") is disclosed. A new class of storage devices is interconnected via very high bandwidth connections, e.g., in racks of storage devices, within a data center, or even across data centers. These storage devices form part of a "fabric" and can be configured for use with other storage devices, e.g., in a "cluster" of storage servers or storage devices, to provide increased capacity, reduce latency, or respond to other storage-related needs. Commonly, administrators configure these storage devices manually, e.g., initially during deployment, during reallocation (e.g., to a different cluster), or during decommissioning. However, this can be a time consuming, labor-intensive and error-prone process. The disclosed technology can use profiles to facilitate configuration, reconfiguration, and decommissioning of storage devices.

Various profiles can be defined for applications, e.g., Microsoft Exchange mail servers, database servers, file servers, etc. The profiles can specify conditions and actions. A condition can indicate a target capacity, responsiveness, availability, age, version number, or other storage-related attributes. An action indicates what to do when the condition is met. For example, a profile can specify that if the storage capacity of a server, e.g., an Exchange mail server, is 80% full (a condition), then an additional storage device should be assigned to a cluster and data is to be rebalanced across the augmented cluster (an action). Administrators can install one or more profiles. Alternatively, in the infrequent yet possible case where applications desire bare metal resources (i.e., non-virtualized resources), applications can have associated therewith suggested profiles for optimal performance, e.g., that are approved and installed into a profiles database by administrators.

A monitoring component executing at a computing device can monitor events to determine whether one or more conditions specified by the various profiles has been met. This monitoring component can execute at one or more computing devices, e.g., a management console, a data storage server, or other computing device. Various components of the data storage system can emit events to indicate status, e.g., capacity utilization, bandwidth utilization, errors, etc. alternatively, the monitoring component can query various components for this information. Upon receiving this information, the monitoring component can determine whether one or more conditions have been met. In various embodiments, the first condition that is met is selected. In other embodiments, the conditions may have a priority order and the condition with the highest priority is selected. The monitoring component then triggers the action associated with the condition. Some actions can be taken without human input or involvement. As an example, associating a storage device with a particular cluster may not require human input or involvement. Other actions may require human input or involvement. As an example, permanently decommissioning an out of date storage device may require physically removing the storage device from the network.

The monitoring component may invoke one or more automation layers to cause the actions to occur. As an example, the monitoring component may invoke an application program interface (API) provided by an automation layer executed by a storage device, a storage server, a network device, etc. The API may be provided by a device driver or other software or hardware component. The automation layer can translate invocations of the API to various commands that are issued to devices, e.g., to remove them from an inventory, configure them for a particular use, reset them, return them to the inventory, and so forth.

In various embodiments, the disclosed technology recommends devices for adding to an inventory. As an example, upon receipt of multiple profiles and detection of various events, the technology may predict that one or more various devices may be needed in the future. The technology may then alert a system administrator, e.g., to acquire additional devices and add them to the inventory. As a particular example, the technology may indicate that an additional data storage server may be required to add capacity or reduce latency for a Exchange server installation.

In various embodiments the technology is capable of adapting hardware, installing software, downgrading software to prior versions, etc.

The lifetime of a data storage server has four stages: initialization and/or configuration ("day 0"); provisioning and/or usage ("day 1"); upgrading of hardware and/or software ("day 2"); and decommissioning ("day 3"). The disclosed technology manages this lifetime, e.g., by implementing and managing an inventory of devices, e.g., data storage servers.

In various embodiments, the technology implements methods and systems, comprising receiving a profile, wherein the received profile indicates a condition and an action corresponding to the condition; monitoring events emitted by devices of the data storage system; determining based on the monitored events that a device of the storage system matches the indicated condition; and performing the action corresponding to the indicated condition, wherein the action includes managing data stored by the data storage system. The technology can further comprise receiving multiple profiles; identifying two or more profiles whose conditions are matched by the monitored events; and selecting one of the profiles whose action is to be performed. The condition can specify one or more attributes of the storage system. The specified one or more attributes can be one or more of capacity, performance, deployment time, age, power consumption, version, etc. If the action is to add a device, the method can comprise identifying a device from an inventory of available devices; assigning the identified device to a data storage server; and configuring the assigned device to operate with the data storage server. The method can further comprise transferring, prior to the configuring, data stored at the device to a different device configured to operate with the different data storage server. If the action is to decommission a device, the method can trigger actions to transfer stored data to other devices of a data storage. The method can further comprise deleting data stored at the device to be decommissioned. The method can further comprise placing the decommissioned device into an inventory of available devices. The method can further comprise configuring the device to be no longer assigned to a data storage server with which the device is presently associated.

Technology is disclosed for actively responding to data storage traffic ("the technology"). System administrators commonly configure a data storage services infrastructure based on anticipated storage needs. Over time, however, those storage needs may change. For example, data storage traffic may change over a period of days, weeks, months, or even years to respond to different types of use. As these data storage traffic patterns change, the demands on various data storage devices also varies. In a conventional data storage system, it can be possible to determine where data storage demands are at a peak ("hotspot"). However, making the same determination in a virtualized environment can be difficult, e.g., because data traffic targeting various data storage devices may all originate from or target a particular virtual data storage component (collectively, "endpoints"). In such cases, system administrators may benefit from being able to determine how best to reallocate virtual data storage components, e.g., to different physical servers.

The various virtual data storage components can provide application program interfaces (APIs) that enable an application, e.g., a management console, to query for various information associated with the virtual data storage components. As an example, a management console can query the various virtual data storage components to determine how much data (e.g., network traffic) the virtual data storage component is handling. This API thus enables "visibility" of data traffic flow at a highly granular level.

In various embodiments, the technology can selectively "instrument" the various virtual data storage components to quickly determine where the hotspots lie. As an example, the technology can first determine that a storage volume is hot and follow a path back to the source of the data being transmitted or requested from the storage volume, one storage component at a time. This can occur automatically, e.g., based on various events, crossing thresholds of performance (e.g., latency, capacity utilization, etc.), or manually, e.g., using a management console. In various embodiments, an application (e.g., database server, web server, etc.) may also be instrumented so that the technology can determine which application or even which portion of the application is causing hotspots. In some embodiments, the technology can identify which users are using which volumes or portions of data.

Thus, the technology employs agents that either reside in data storage components or communicate with the storage components, e.g., via an API provided by the agents. The data storage components can be volumes, server, networking components, servers, etc. The technology can then selectively enable and disable the various agents to determine which data storage components, endpoints, and/or users are causing the hotspots, e.g., to perform an impact analysis. The agents themselves may in turn employ APIs provided by the various data storage components, e.g., to receive data, turn instrumentation on or off, etc.

The technology can identify a hotspot at an application, an intermediary component, or a storage volume (whether physical or virtual) and selectively check data flows (e.g., each intermediary virtual or physical device) to diagnose the source of the data or network traffic. Once so determined, a system administrator can be alerted so that the system administrator can take various actions, e.g., to add capacity, solve problems, etc.

In various embodiments, the technology enables analysis of storage level data flows at a higher, "logical" level to recommend a particular storage configuration, e.g., to satisfy "service level objectives." Storage operations transiting virtual data storage components can be mirrored or duplicated at a workload analyzer. In various embodiments, the workload analyzer can be a virtual data storage component that receives a duplicated copy of data storage operations, e.g., from a virtual storage appliance or from a different virtual data storage component. The workload analyzer can review contents of network traffic, e.g., data indicating, at a storage layer level, a source, a destination, a type of data, and/or volume of data. As an example, the workload analyzer can determine which application is sending or requesting data, which logical storage volumes are targeted, etc. The workload analyzer can then compare the actual workload to previously specified service level objectives. The workload analyzer can then determine, e.g., based on statistics or simulations, what storage configuration changes can be made to satisfy the service level objectives. As examples, the workload analyzer may recommend addition of a cache, volume, storage server, etc. In various embodiments, the workload analyzer can perform this analysis and recommendation dynamically, e.g., by alerting a system administrator of predicted performance or capacity issues.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Turning now to the figures, FIG. 1 is a block diagram illustrating various components 100 in an environment in which the disclosed technology may operate in various embodiments. The components 100 can include one or more server computing devices, e.g., data storage server 102a, data storage server (also, "storage server") 102b, and data storage server 102n. The server computing devices 102 are described in more detail below in relation to FIG. 2. The server computing devices 102 can communicate with one or more client computing devices 106 over a network 104. The network 104 can be an intranet, the Internet, or a special-purpose network. Multiple client computing devices 106 (e.g., client computing devices 106a, 106b, and 106m) can communicate with the server computing devices 102, e.g., to store data.

Figure 2:
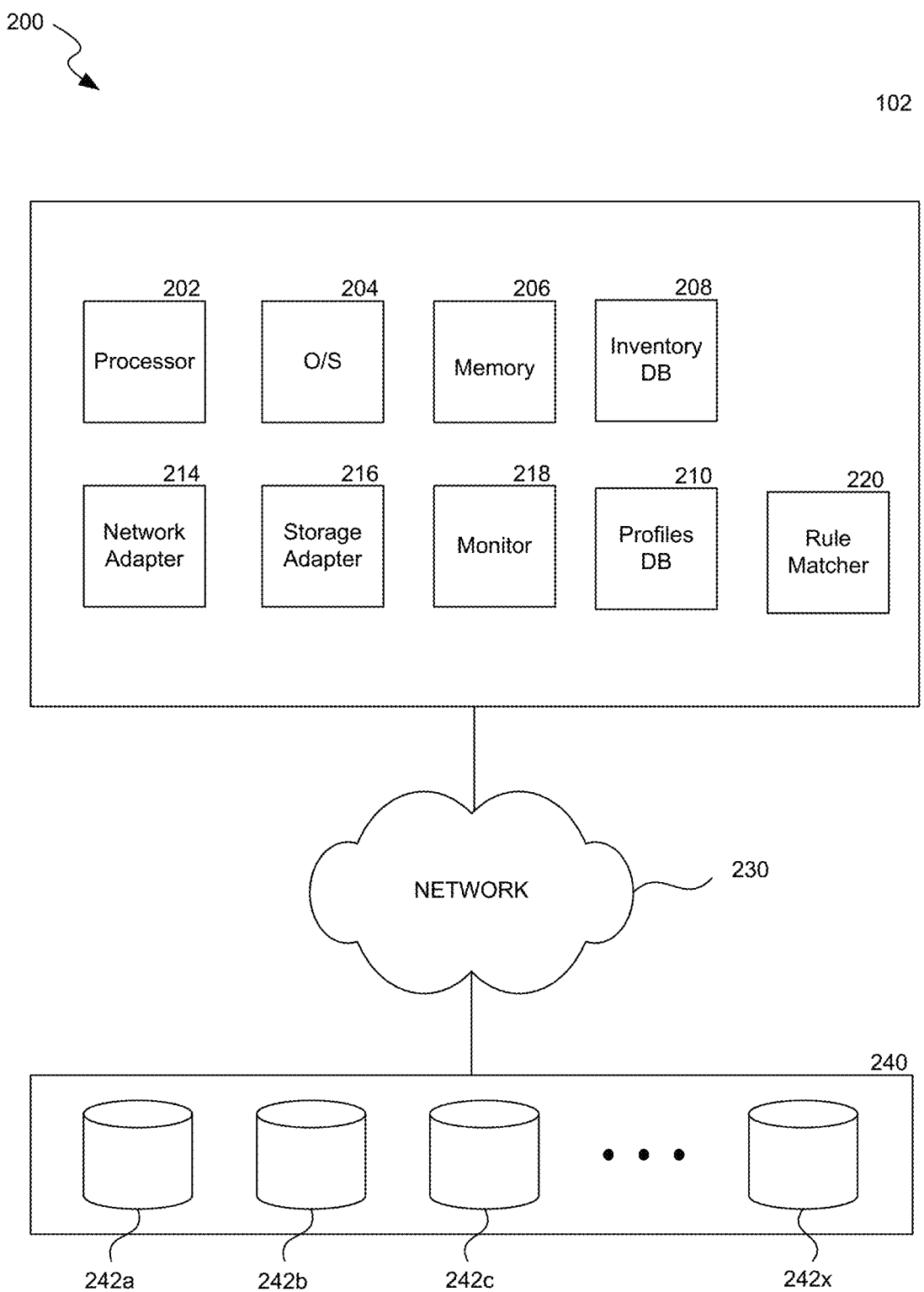
FIG. 2 is a block diagram illustrating various components of a data storage server.

FIG. 2 is a block diagram illustrating various components 200 of a data storage server 102. The data storage server 102 can be referred to as a network storage appliance or "filer" and can be a special-purpose computer that provides file service relating to the organization of information on data storage devices 242, e.g., hard disk drives or solid state drives. The illustrated storage server 102 comprises one or more processors 202 (e.g., single or multi-core processors), memory 206, a network adapter 214, and a storage adapter 216 interconnected by a system bus (not illustrated). The storage server 102 also includes an operating system 204 that implements a file system to logically organize the information as a hierarchical structure of directories and files on data storage devices 242. A processor 202 can cause the storage adapter 216 to read and write data from/to data storage devices 242.

In the illustrative embodiment, the memory 206 has storage locations that are addressable by the processor and adapters, e.g., for storing software program code and/or data. The processor and adapters may, in turn, comprise processing elements and/or logic circuitry configured to execute software code and manipulate data structures. The operating system 204, portions of which are typically resident in memory 206 and/or storage devices, and executed by the processors 202, functionally organizes stored data by, e.g., invoking storage operations in support of a file service implemented by the storage server 102.

The network adapter 214 comprises mechanical, electrical, and signaling circuitry needed to connect the storage server 102 to a client computing device 106 over network 104. The client computing device 106 may be a general-purpose computer configured to execute applications, e.g., a database application. Moreover, the client computing device 106 may interact with the storage server 102 in accordance with a client/server model of information delivery. That is, the client may request the services of the filer, and the filer may return the results of the services requested by the client, e.g., by exchanging data communications packets encapsulating a data communications protocol, e.g., in a common Internet file system (CIFS) protocol or network file system (NFS) protocol format.

The storage adapter 216 can cooperate with the operating system 204 executing on the storage server 102 to access information requested by a client computing device 106. The information may be stored on the data storage devices 242, e.g., in logical "volumes." The storage adapter 216 includes input/output (I/O) interface circuitry that couples to the data storage devices 242 over an I/O interconnect arrangement, e.g., a conventional high-performance, Fibre Channel serial link topology, SAS, SCSI, SATA, etc. The storage adapter 216 can communicate with the data storage devices 242 over a network (or switch) 230. The data storage devices 242 can be housed in an enclosure 240, e.g., in the same rack as the storage server 102 or a different rack.

The data storage server 102 can include an inventory database 208, a profiles database 210, a monitoring component 218, and a rule matcher component 220. The inventory database can store indications of devices, e.g., data storage servers and/or status of those data storage servers. As an example, the inventory database 208 can store indications of data storage servers that are available to be assigned to a cluster. The profiles database 210 can store one or more profiles. Profiles can be added by an administrator, e.g., when installing an application or manually.

Although components 202 are indicated to be associated with a data storage server, they may also or instead be associated with a different type of server, e.g., a management console server.

Figure 3:
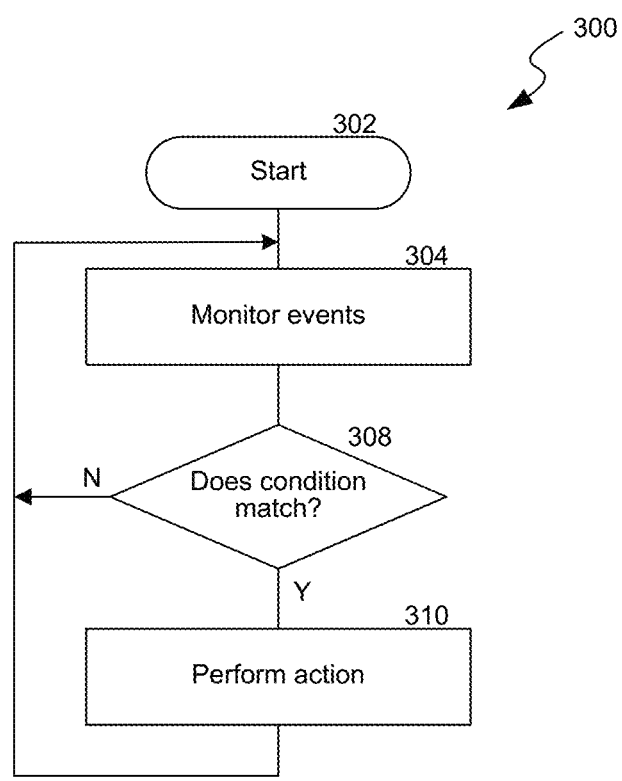
FIG. 3 is a flow diagram illustrating a routine invoked by the disclosed technology in various embodiments.

FIG. 3 is a flow diagram illustrating a routine 300 invoked by the disclosed technology in various embodiments. In various embodiments, the routine 300 can be either continuously executed by the rule matcher component 220 or on-demand by an administrator. The routine 300 begins at block 302. At block 304, the routine monitors events. As an example, various components of storage servers may emit events at various times. Alternatively, a monitoring component can trigger the components of the storage server to emit events. Examples of events can include, e.g., storage utilization, network bandwidth issues, latency issues, errors, etc. At decision block 308, the routine determines whether one or more of the events match conditions indicated by one or more profiles. When more than one rule is matched for a given condition, either an additional priority field is used to decide which order the action(s) will be executed or, in its absence, the actions are executed in order in which it is declared in the profiles database. If true, the routine at block 310 performs an action corresponding to the matched event and returns to block 304. If false, the routine returns to block 304.

Figure 4:
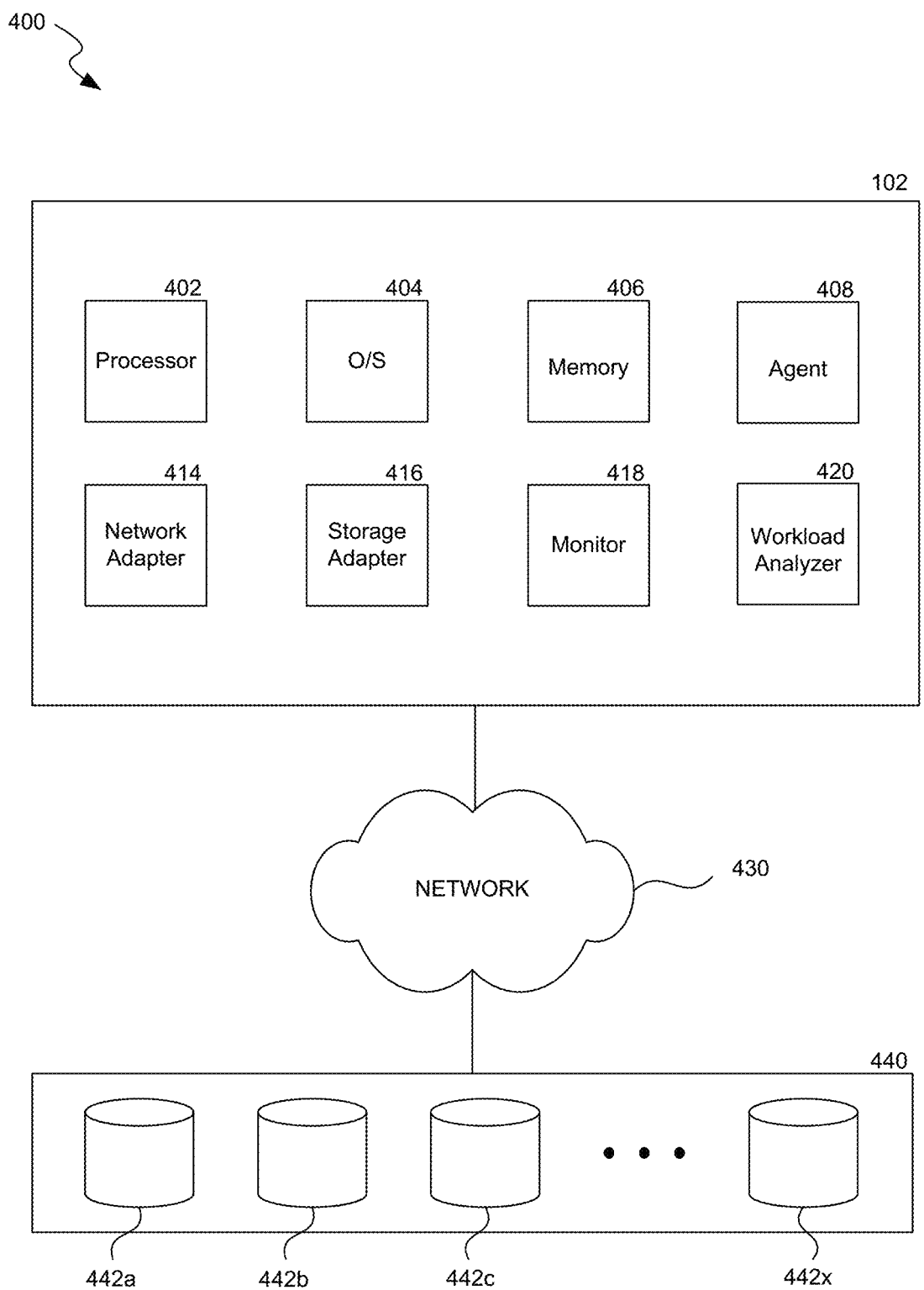
FIG. 4 is a block diagram illustrating various components of a data storage server.

Each profile can be specified as a rule-action pair. Some example of rules include:
  storage device age>X years
  storage device age<X years
  storage device hasSupportAgreement
  storage device CPU=model X
  storage device Memory>=X GB
  storage device port type FCoE, 10GigEthernet, . . . .
  number of storage device ports>=X
  storage device CPU>X %
  storage device CPU<X %
  storage device to media type=HDD, or SSD, or NVMe, etc.
  storage device is n-way HA=1, 2, 4, . . . .
  storage cluster capacity used>X %
  storage cluster capacity used<X %
  storage device capacity used>X %
  storage device capacity used<X %
  if storage device software version<X
  if storage device software version>X
  Examples of actions can include:
  evacuate data stored in device
  perform non-disruptive upgrade
  perform disruptive upgrade
  wipe clean
  migrate storage device to new cluster
  send warning email to administrator
  send recommendation email to administrator
  send [other] email to administrator FIG. 4 is a block diagram illustrating various components 400 of a data storage server 102. The data storage server 102 can be referred to as a network storage appliance or "filer" and can be a special-purpose computer that provides file service relating to the organization of information on data storage devices 442, e.g., hard disk drives or solid state drives. The illustrated storage server 102 comprises one or more processors 402 (e.g., single or multi-core processors), memory 406, a network adapter 414, and a storage adapter 416 interconnected by a system bus (not illustrated). The storage server 102 also includes an operating system 404 that implements a file system to logically organize the information as a hierarchical structure of directories and files on data storage devices 442. A processor 402 can cause the storage adapter 416 to read and write data from/to data storage devices 442.

In the illustrative embodiment, the memory 406 has storage locations that are addressable by the processor and adapters, e.g., for storing software program code and/or data. The processor and adapters may, in turn, comprise processing elements and/or logic circuitry configured to execute software code and manipulate data structures. The operating system 404, portions of which are typically resident in memory 406 and/or storage devices, and executed by the processors 402, functionally organizes stored data by, e.g., invoking storage operations in support of a file service implemented by the storage server 102.

The network adapter 414 comprises mechanical, electrical, and signaling circuitry needed to connect the storage server 102 to a client computing device 106 over network 104. The client computing device 106 may be a general-purpose computer configured to execute applications, e.g., a database application. Moreover, the client computing device 106 may interact with the storage server 102 in accordance with a client/server model of information delivery. That is, the client may request the services of the filer, and the filer may return the results of the services requested by the client, e.g., by exchanging data communications packets encapsulating a data communications protocol, e.g., in a common Internet file system (CIFS) protocol or network file system (NFS) protocol format.

The storage adapter 416 can cooperate with the operating system 404 executing on the storage server 102 to access information requested by a client computing device 106. The information may be stored on the data storage devices 442, e.g., in logical "volumes." The storage adapter 416 includes input/output (I/O) interface circuitry that couples to the data storage devices 442 over an I/O interconnect arrangement, e.g., a conventional high-performance, Fibre Channel serial link topology, SAS, SCSI, SATA, etc. The storage adapter 416 can communicate with the data storage devices 442 over a network (or switch) 430. The data storage devices 442 can be housed in an enclosure 440, e.g., in the same rack as the storage server 102 or a different rack.

The storage server 102 can include an agent 408 that exposes an API and can employ APIs provided by other storage components, e.g., to retrieve and provide performance-related data, operational data, configuration data, etc.

The storage server 102 can include a workload analyzer 420. The workload analyzer can instead be a component completely separate from the server 102. The workload analyzer can receive data traffic, e.g., duplicated data traffic, to determine how to optimally configure the storage system or storage network, e.g., by adding or reconfiguring data storage devices, whether virtual or physical.

Although components 402 are indicated to be associated with a data storage server, they may also or instead be associated with a different type of server, e.g., a management console server.

Figure 5:
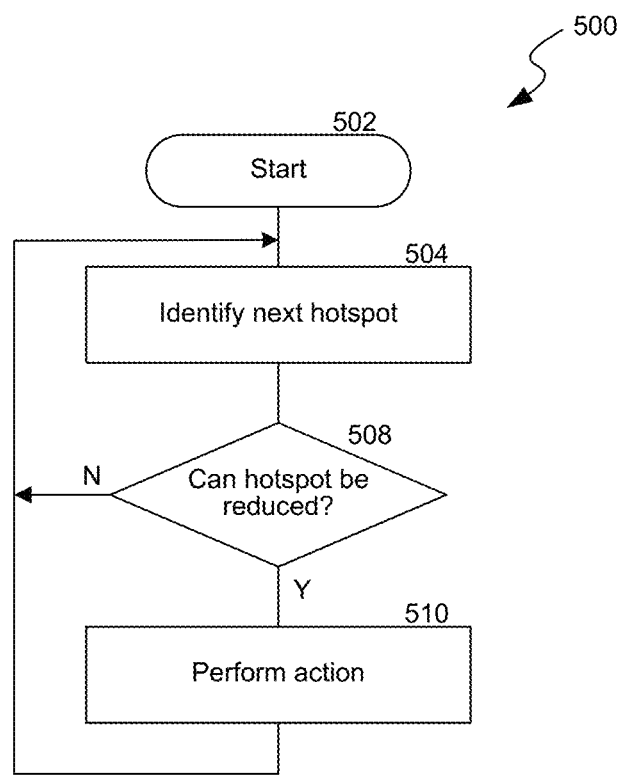
FIG. 5 is a flow diagram illustrating a routine invoked by the disclosed technology in various embodiments.

FIG. 5 is a flow diagram illustrating a routine 500 invoked by the disclosed technology in various embodiments. The routine 500 begins at block 502. At block 504, the routine 500 identifies a next hotspot. During a first iteration, the routine 500 identifies a first hotspot, e.g., a storage component whose utilization or capacity exceeds a threshold value. During a subsequent iteration, the routine 500 identifies a component in the data path that also has a hotspot, e.g., a different component from which data is received or to which data is sent. At decision block 508, the routine determines whether the hotspot can be reduced. As examples, the hot spot may be capable of being reduced by adding hardware or an additional virtual component. If true, the routine continues at block 510 to perform an action corresponding to the determination at decision block 508 on how to reduce the hotspot, and returns to block 504. If false, the routine returns to block 504. The action can be to cause a reconfiguration, alert a system administrator, etc.

Figure 6:
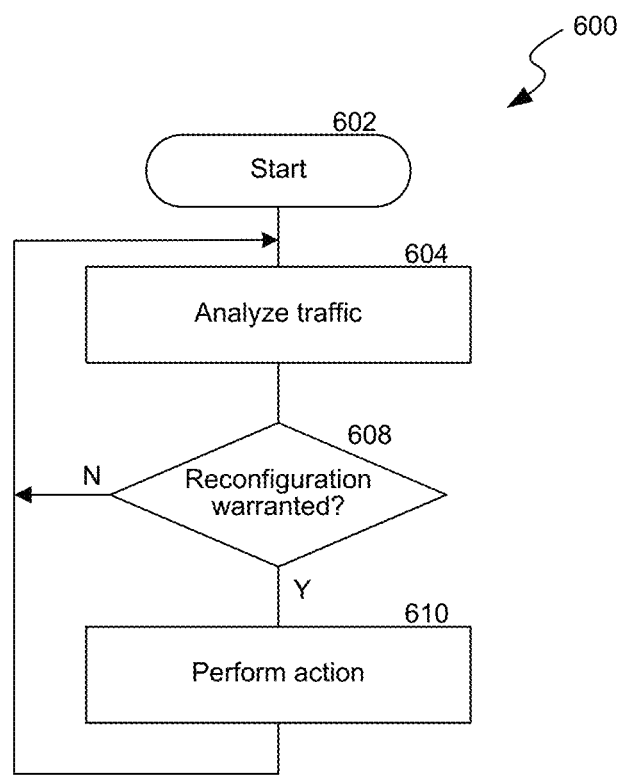
FIG. 6 is a flow diagram illustrating a routine invoked by the disclosed technology in various embodiments.

FIG. 6 is a flow diagram illustrating a routine 600 invoked by the disclosed technology in various embodiments, e.g., by a workflow analyzer component. The routine 600 begins at block 602. At block 604, the routine 600 analyzes data storage traffic, e.g., duplicated data storage traffic that is mirrored to the workflow analyzer. At decision block 608, the routine determines whether reconfiguration is warranted. As an example, the routine may determine whether the data storage traffic is not in conformance with one or more service level objectives. Various techniques exist on how to make this determination. If true, the routine continues at block 610 to perform an action corresponding to the determination at decision block 608, and returns to block 604. If false, the routine returns to block 604. The action at block 610 can be to reconfigure a component or suggest, e.g., to a system administrator, what components should be reconfigured.

In various embodiments, the technology disclosed herein can employ (or work in conjunction with) a networked storage architecture, e.g., NetApp®'s Clustered Data ONTAP®, that is connected to servers that run virtual and/or physical instances of applications and/or Operating Systems using a switching fabric. The networked storage architecture may provide, inter alia, some or all of the following properties:

Flat: any to any latency and bandwidth is relatively constant,

Scalable isolation: Islands of communicating processes can be measured in millions, and Policy enforcement at line speeds: Selective actions can be applied at line speeds to packets that match predicates. Actions like:

Deny

Permit

Redirect

Log

Copy

Mark

Hotspot Source Detection Using Drill-Down Instrumentation.

Sometime after a storage system is provisioned (e.g., configured), it is likely that a storage hotspot will develop over time, thereby making the configuration sub-optimal. A hotspot is a portion of a storage device or storage system that is accessed at a higher rate than other portions. By analyzing statistics, it is possible to quickly identify hotspots (e.g., storage volumes, devices, etc.) To tackle this hotspot the administrator needs to figure out two things:

1. Who is the source(s) of this heavy traffic, and
2. How to remediate the problem (move storage to faster tier/freer controller, etc.)

Typically abnormal traffic from source(s) can be because:

1. Violation of service level objectives (SLOs): Load exceeded expectations at the time of provisioning, or
2. A runaway client: An operational singularity (e.g., bug).

Regardless of the case, identifying the source of the traffic is useful for formulating a remediation plan.

Source hotspot detection is made harder these days due to layers of virtualization in the server, storage and network.

The following information can be stitched together to identify the truant source:

From storage controller, identify hot file/volume and derive the network (or SAN) connection showing most traffic to hot file.

From network, find all end-points that use that storage connection.

From client machine, find virtual machines (VMs) using those end-points.

Once a potential victim has been identified, it can be remediated using one of these techniques:

Throttle the truant VM.

Apply back pressure using network.

Redirect traffic to a load-sharing mirror.

Drop connection.

Use network statistics to drive this first.

This=would have been easy if one could instrument all components at all times. However, in real systems, instrumentation is expensive and should be selectively enabled. The above methodology lends itself well to a "drill-down" approach.

When a hot volume/file is detected at the storage controller instrumentation can be dynamically enabled at the end points that part of the virtual overlay that is the source of traffic to the hot file. Once the hottest sources in that group are identified, finer grain instrumentation is enabled only at the virtual switches that are part of those hot end points. That leads to hot/runaway VM identification. One can go a step further and use taps into the operating system (OS) to figure out which processes are generating hot traffic.

This approach can be used with storage systems serving virtualized clients or physically distributed clients.

Dynamic Storage Service Insertion.

There are many ways to leverage the ability to dynamically insert services to existing flows that will be possible in switching fabrics. For example, use of "Redirect" and "Copy" actions may provide the ability to insert interesting capabilities inline or along-side flows.

The type of storage services that are useful are:

Caches: These are intermediaries that can offload some of the read/write traffic from high intensity at the source.

Workload analyzers: These are intermediaries that can do packet capture of short term traffic, extract workload characteristics.

By dynamically inserting workload analyzers, storage management decisions can be tuned dynamically, e.g., at runtime. For example, a workload analyzer may analyze storage traffic and predict that additional storage replicas may need to be brought online, e.g., to distribute storage traffic across multiple computing devices. As another example, the workload analyzer may recommend that a reduction in deduplication may improve responsiveness or compliance with one or more SLOs.

When an administrator detects sub-optimal usage of resources, the administer can deploy the workload analyzer service either "in-band" or "along-side" the flow of data. For most purposes an along-side deployment is acceptable albeit it can be lossy (e.g., SPAN). Tuning recommendations resulting from such analyzers should be applicable despite modest packet capture loss. The decision to use the results of the analyzer to tune storage can either be advisory or automated.

The technology may generally be applicable to policy based networks with service insertion capabilities in combination with any storage system.

Managing Data Protection Traffic

To achieve resilience to component and/or site failures, an up-to-date copy of data is kept redundantly on one or more components or sites. This continuous traffic between the primary and redundant (referred to as secondary) copies is the data protection traffic. To achieve a Recovery Point Objective (RPO) and a Recovery Time Objective (RTO), an appropriate quality of service (QoS) is specified starting at the source of updates (primary), through a network link between the primary and secondary, and at the destination (secondary). When multiple such protection streams compete for resources, their allocation of resources is apportioned.

There are multiple challenges in ensuring this apportioning:
1. How to re-adjust allocations when any one of the three elements—primary, network, secondary—get congested and are not able to keep up.
2. How to do this at large scale, e.g., when there are millions of such primary-secondary pairings (as would be the case when fine grain data protection is required e.g., at the virtual machine disk (VMDK) level.

The change rate (or update frequency) at the primary can be used as the primary determinant of the bandwidth needed for protection traffic and can be left steady (e.g., constant) throughout the protection traffic.

In order to react to network congestion, a variable scheme is used, including actions at the source and destination in case they turn out to be the bottleneck.

Depending on what element gets congested, various actions can be taken at the remaining elements.

If the destination is congested, then writes can be staged in a faster media e.g., solid state drives (SSDs) if available. At some later time this data can be moved to its intended location e.g., hard disk drive.

On the granularity issue, the ability to create data protection traffic between two storage systems on variable granularity, e.g., some file based, some volume based, is achieved by creating network overlays per traffic flow. This is possible when the underlying fabric supports scalable isolation. Once isolated, QoS can be applied to each protection traffic.

The technology is generally applicable to any network system with scalable isolation carrying data protection traffic between two storage systems.

Efficient Load Balancing in Trunked Ports

Link aggregation or port trunking involves various methods of combining (aggregating) multiple physical network connections or ports in parallel to form a single logical link to increase throughput beyond what a single connection could sustain, and to provide redundancy in case one of the links fails. Link aggregation can happen between ports of any two networking-capable end devices such as between two network switches, or between a switch and a server, or a switch and a network storage controller. Each end device implements some method to balance the load across all the physical network links in an aggregation, to better utilize all the links and maximize throughput. Such methods are typically based on computing a hash of one or more attributes of the network flow, such as source/destination IP addresses, source/destination ports or source/destination MAC addresses, and then mapping the hash uniquely to one physical link in the group.

1) Choice of the load-balancing algorithm tends to be a static configuration at the server or storage controller, without sufficient run-time knowledge of the environment or the network flows that are passing in and out of it. With virtualization, this problem gets even worse especially for traffic between a virtual machine (VM) at one end and a storage controller at the other end. In such scenario, data stores on the storage controller are exported via NFS or CIFS with different interface addresses (IP addresses), and there is a single Ethernet interface on the hypervisor that carries traffic for all I/O going to these data stores for a certain storage protocol. Since the same ethernet interface carries traffic going to the data stores from all VMs, all the flows from different VMs end up getting the same destination MAC address for their flows, which leads to a poor balancing of flows from various VMs across different links in a port group if the destination MAC address is the attribute used for port selection.

2) The end device connected to the network switch lacks visibility on the network connectivity or characteristics, and so may choose a load-balancing method that does not align well with the network. For example, if a storage controller has programmed a MAC-address based load-balancing for a certain aggregation of ports, but it so happens that these ports are connected directly to a router and not to a switch (which means every outgoing frame gets the MAC address of the router as its destination MAC address). In this case, there will be no spraying and only one link of the aggregation keeps getting used. Thus, lack of visibility for the end device that it is in fact connected to a router causes its chosen load-balancing method to fail.

3) Each end device chooses the load-balancing method it uses independently of the other end to which its links are connected. For example, a network switch may pick an IP address based load-balancing for the outgoing packets on its trunked ports, whereas a storage controller connected at the other end of the trunked ports might pick a MAC address based load-balancing scheme. The storage controller's load-balancing algorithm determines the member port of the trunk to use to transmit outgoing traffic, and does not control which link the inbound frames are received on. The switch that the ports of the same trunk are connected to, uses its own load-balancing algorithm to spray traffic within the trunk, and thus determines which member port of the storage controller will receive traffic. In this model, both entities do not have any insight or visibility into each other's load-balancing rules. This could result in a case where, by coincidence, the load-balancing algorithm used by the network switch and the one used by the other end device happen to pick the same link for most of the flows, in which case that link gets overwhelmed and the other links in the aggregation go under-utilized.

A better approach to balance the load across the links in an aggregation would be to pick a load-balancing method based on the current network connectivity, traffic conditions and information from both end devices that are connected using the aggregation. This would enable an intelligent load-balancing scheme that utilizes all the links in the aggregation more effectively. Three methods are suggested here:
1) Use programmable interfaces exposed by software-defined infrastructures to dynamically choose a load-balancing method depending upon the current flows, network state and requirements of both end devices connected via the trunked port.
2) Use other attributes from higher layers as additional components to the tuple for hash computation, to get better granularity on the load distribution between the outgoing links of an aggregation.
3) For traffic going in and out of a storage controller, associate different virtual MAC addresses with each L3 interface exposed by a storage controller, so that using MAC address based load balancing will still achieve good load distributions across different links of an aggregation, especially for virtualized environments.

Method 1

Figure 7:
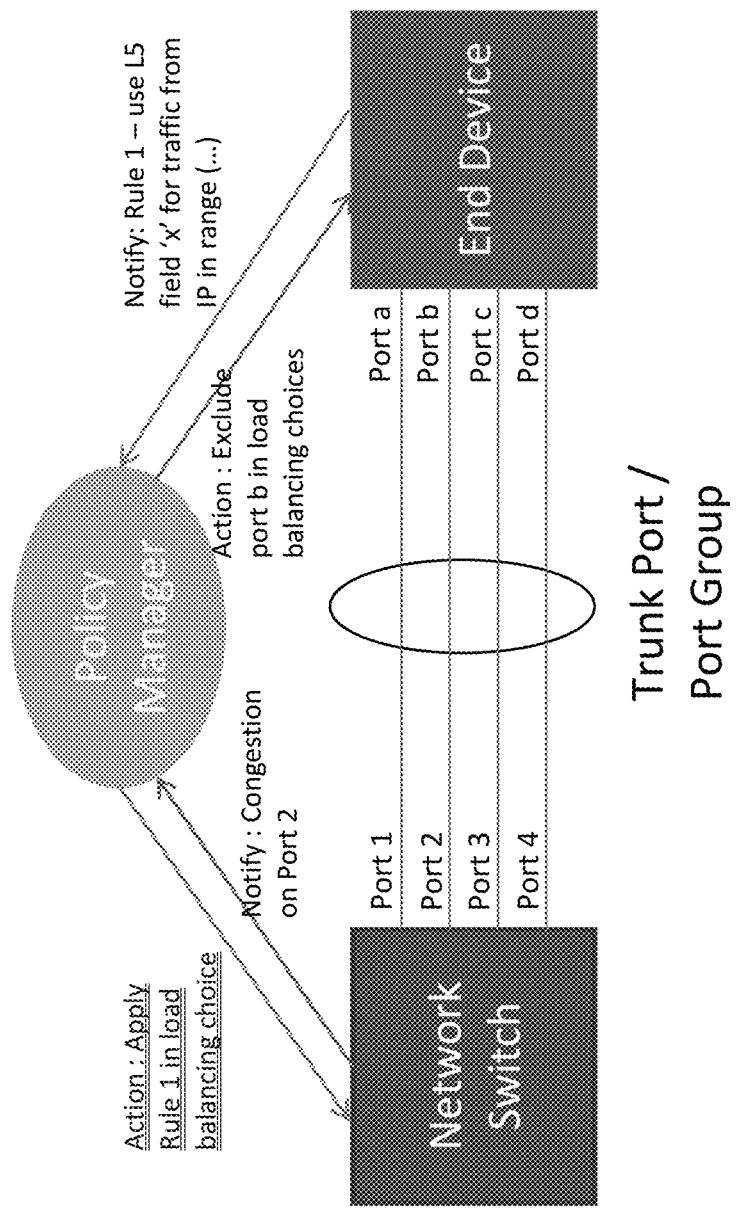
FIG. 7 is a block diagram illustrating use of a policy manager to monitor and/or assert policies on network connections and data traffic between a network switch and a device, consistent with some embodiments.

With the advent of software-defined networking, it is possible to program network entities (e.g., switches and routers) from other end devices (e.g., servers and storage controllers) by using programmable interfaces exposed by a software controller that has visibility to the network fabric. The method uses such programmable interfaces to have the network switch and the other end device it is connected mutually communicate their load balancing rules and requirements to each other. As shown in FIG. 7, it is assumed that a software entity, e.g., a "policy manager" that can program network devices, and exposes some programmable interfaces through which end points connected to the network devices can send and receive information. For example, as shown in FIG. 7, the end device (server, storage controller, etc.) could communicate its load-balancing schemes, as well as rules on when to apply which scheme, to the network switch. The network switch could then dynamically pick a scheme during operation based on the rules received, its own load-balancing rules, and the current network state (connectivity information and traffic conditions), since the switch has visibility to the network state through its neighboring switches. The network switch could also notify the end device about which load-balancing scheme it is currently using to spray traffic on the outgoing links of its aggregation, and what the current network state is (such as the congestion state as shown in FIG. 7). The end device could then use this information to control which scheme it will use to load-balance across its outgoing links that are connected to the switch. Thus, both the switch and the end device it is connected to work in a coordinated manner to exchange information and make a more informed decision on the load-balancing method at the current time for the current flows, solving Problem 3 (above). With this approach, if a storage controller is directly connected to a router, the router could notify such connectivity information to the storage controller during operation, which will inform the storage controller to pick a load-balancing method other than destination MAC address-based method, solving Problem 2 (above).

Method 2:

In this method, we add other attributes to the tuple for the hash computation that decides the outgoing link of the aggregation to use for a certain flow. For example, using the unique identifier for each virtual machine (VM ID) as another field in the hash tuple might lead to better load balancing of traffic from different VMs on the same physical server. We could also add Layer-4 and Layer-5 attributes specific to different protocols. For example, in case of a storage controller, it might be relevant to add attributes such as a file identifier or LUN identifier which is carried in the protocol headers of NFS/CIFS/iSCSI and other storage protocols, so that different flows coming from the same client IP address and MAC address still get "sprayed" across different links based on the file or LUN being accessed. Using such additional fields for hashing would help solve Problem 1.

Method 3:

This method addresses traffic flowing into and out of a storage controller. Each exported volume or LUN on a storage controller is associated with a different Layer 3 (L3) address (e.g., IP address), but each such L3 interface does not map 1:1 with a Layer 2 address, which is especially a problem in case of traffic coming from different virtual machines that run on the same physical server. This results in the scenario explained in Problem 1 (above) if a MAC-address based load balancing scheme gets applied at the server. To mitigate this, we could assign different MAC addresses to different L3 interfaces, so that each L3 interface is associated with a distinct MAC address. With this solution, traffic from different VMs going to different exported volumes would not end up using the same destination MAC address and so, a destination MAC address-based load balancing method at the server would be still able to achieve effective distribution of traffic from different VMs across the links in a trunked port. This helps solve Problem 1 (above).

Using DSCP Marking for QoS

Technology is disclosed for enforcing end-to-end application service-level objectives (SLOs). An SLO is a specification of objectives that the user/customer would like an application to meet. Meeting these objectives directly impacts the business objectives. SLO monitoring and enforcement is typically handled by individual layers of the software stack such as enforcement of CPU resources by the hypervisor, network resources by the fabric, and storage bandwidth and latency by the storage controller. Each layer, in addition, has a static method for setting the quality-of-service (QoS) parameters—that is, a QoS value is set at resource creation and is rarely changed.

In contrast to the above approach, the technology combines the quality-of-service (QoS) mechanisms of a storage system along with the QoS mechanisms of the hypervisor and network to provide end-to-end QoS. Our method is made possible by the emergence of software-defined infrastructures where the components can be monitored and controlled through a set of APIs; these APIs thus allow programmatic control (orchestration) of all resources. The invention makes two claims:

1. We provide a method to dynamically "marking" a network packet to enforce application level SLOs at the network level, and
2. We provide a method for determining the appropriate network QoS level to mark each of the network flow.

These methods can be applied to both flows generated between (1) an application server and storage server, and (2) two or more controllers of a distributed system. The environment is setup as follows. The application is provisioned in the software stack with a given SLO; the SLO specifies performance objectives, recovery objectives, protection, and security objectives. For simpler discussion, we limit the SLO to performance and recovery objectives, e.g., the SLO may specify that the application wants to achieve 1000 transactions/sec and wants 99.99% availability. This specification translates to a topology such as that illustrated in FIG. 8. It contains an application running on a hypervisor using storage over a network; the storage itself is hosted by a set of controllers. The hypervisor may have a local cache to offload disk IOs.

Simple Case—Two Applications

The first case is when two applications run on a shared infrastructure. Let us suppose that Application-A is a high-priority application and Application-B is a low priority application. Let us also assume that network priority fall into distinct levels: P1—highest priority, P2—normal priority, and P3—low priority. In this case, we mark the packets issued by Application-A to be P1 (highest priority) and Application-2 to be P3 (low priority). However, at some point in time, Application-B could be promoted to a higher priority (perhaps an end-of-moth report needs to be generated). In this case, we can dynamically mark the packets of Application-B to P1 temporarily.

Complex Case—Intermediate Caches

Figure 8:
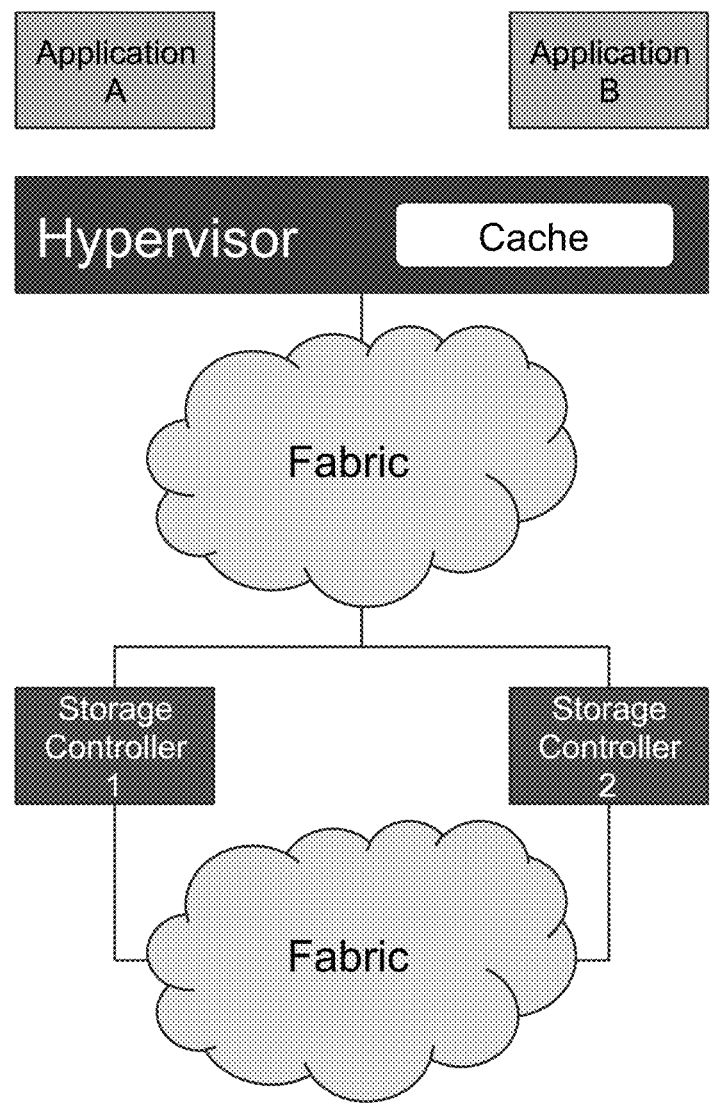
FIG. 8 is a block diagram illustrating a virtualized data storage environment, consistent with some embodiments.

The problem is more complicated when caches are introduced between the application and the storage server. For example, FIG. 8 shows a cache at the hypervisor level and a cache at the storage level. Let us again suppose that Application-A is a high-priority application and Application-B is a low priority application. In the simple case, we marked all messages sent by Application-A to be P1. However, if the hypervisor level cache absorbs most of the IOs issued by Application-A, we unnecessarily reserve fabric resources; Application-A only consumes fabric resources on cache misses hence it would be minimal. A similar problem occurs at the storage level, if Application-A issues mostly read IOs then the backup traffic from controller-1 to controller-2 is minimal; thus the backup traffic generated on behalf of Application-A can be marked at a lower priority P3.

Our algorithm assumes the following inputs:
A set of applications and its SLO; each application has one SLO.
Each application is provided with a workload profile that specifies the incoming traffic, the operation mix, and its cacheability.
A topology is specified per application; the topology includes the set of entities in the software stack.

Figure 9:
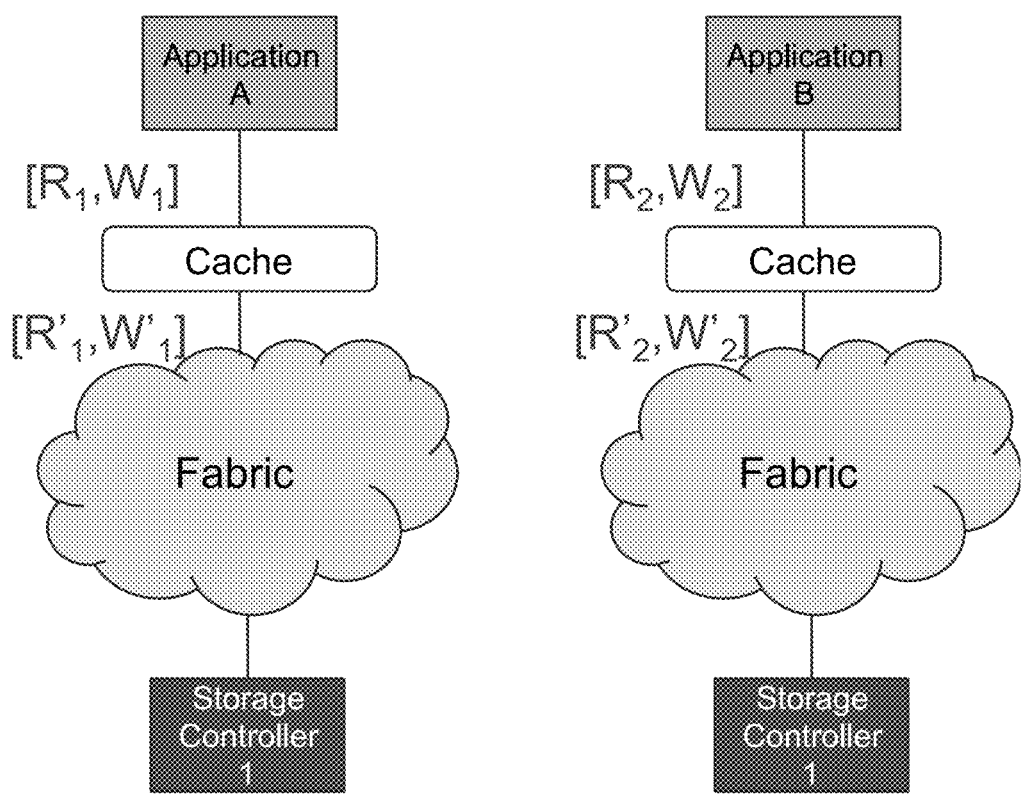
FIG. 9 is a block diagram illustrating a data storage environment, consistent with some embodiments.

Using these inputs, the algorithm determines the DSCP markings for all connections made through the fabric. The algorithm is as follows:
1. The algorithm starts with the incoming traffic specification; the specification specified the rate of operations issued per type. For example, a NFS workload may be specified as 800 read IO/s and 200 write IO/s. For each workload, it computes the residual workload entering the fabric. If the workload is cacheable then the residual workload has a lower intensity. For the above workload, assume a cache hit-ratio of 0.8 for read IOs then, the residual workload has 160 read IO/s and 200 write IO/s.
2. Then, it sums up all total traffic entering the fabric. FIG. 9 shows two applications using a shared network fabric. Application-A has [R'1,W'1] going into the fabric and Application-B has [R'2,W'2] going into the fabric. Furthermore, the algorithm is aware of the application priorities; for this example, let us assume Application-A is high priority and Application-B is low priority. These values are the intensity of the residual traffic. The sum of the total traffic is [R'1+R'2, +W'2].
3. Next, it sets the network DSCP markings. If the total traffic is less than the capacity of the network, i.e., the network has excess capacity, then all traffic flows are given equal priority. If the demand exceeds capacity then, DCSP is used to enforce application priorities. In the above example, if [R'1+R'2, W'1+W'2]>Capacity then Application-A would be marked as P1 (high priority) and Application-B would be marked as P3 (low priority).

Currently, the DSCP mechanism is limited to 64 priority levels. If DSCP (or another variant) is enhanced to respect a richer mechanism, e.g., enforcing throughput/latency in addition to priority levels then the algorithm can convey the specific throughput (packets/sec and the required latency) for each flow. We would use the priority levels only to break ties.

Intelligent Interface Failover

If a port hosting one or more LIFs (logical interface) experiences outage conditions, the LIF(s) on that port will also experience an outage.

Failover groups and failover policies are conventionally implemented in NetApp® Clustered Data OnTap® (cDOT) to provide additional LIF resiliency during outage conditions.

Currently in cDOT, the failover policies are: nextavail, priority, disabled.

Nextavail—Logical Interface (LIF) fails over to the next available port, preferring a port on the current node
Priority—LIF fails over to the next available port as specified in the user-defined failover group
Disabled—a LIF does not fail over Failover groups are lists of ports. A single failover group can be assigned to a LIF at any given time.

Failover occurs in the following scenarios:
Power failure
Automatic revert is enabled on a LIF and that LIFs home port reverts to the administrative up status
The port hosting a LIF changes to the administrative down status
Node reboot or node out of quorum The technology presents a New failover policy: bestavailable Bestavailable—LIF fails over to the best available port, where best available is defined as follows: the LIF prefers to move to a port on the same node as its current port. If no port exists as available on the same node, then the LIF prefers to move to a port on the same iLeaf as its current port. If no port exists as available on the same iLeaf, then the LIF will prefer any port in the failover group assigned to the LIF. If no port exists as available then the LIF status will change to down.

In cases where multiple ports will fulfill the preference of the given LIF, the port with the lowest average throughput will be chosen as the LIF of preference. The average throughput for a port is measured as the sum of the average throughputs of the LIFs assigned to the given port.

In this way when a port fails, the LIFs of that port have the opportunity to fail in a more balanced way across multiple ports which may be available to the given LIF.

Figure 10:
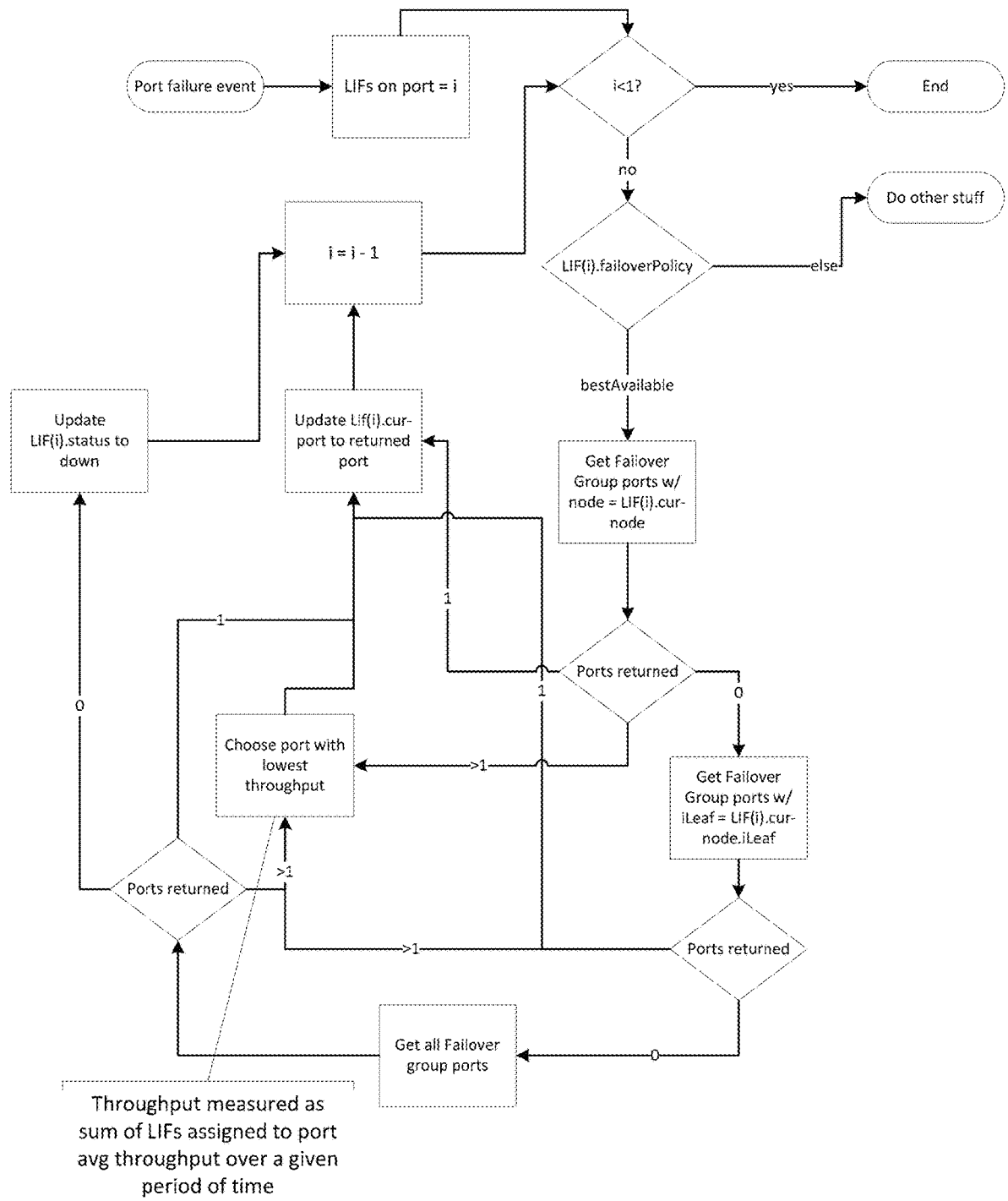
FIG. 10 is a flow diagram illustrating a routine invoked by the disclosed technology in various embodiments.
Figure 11:
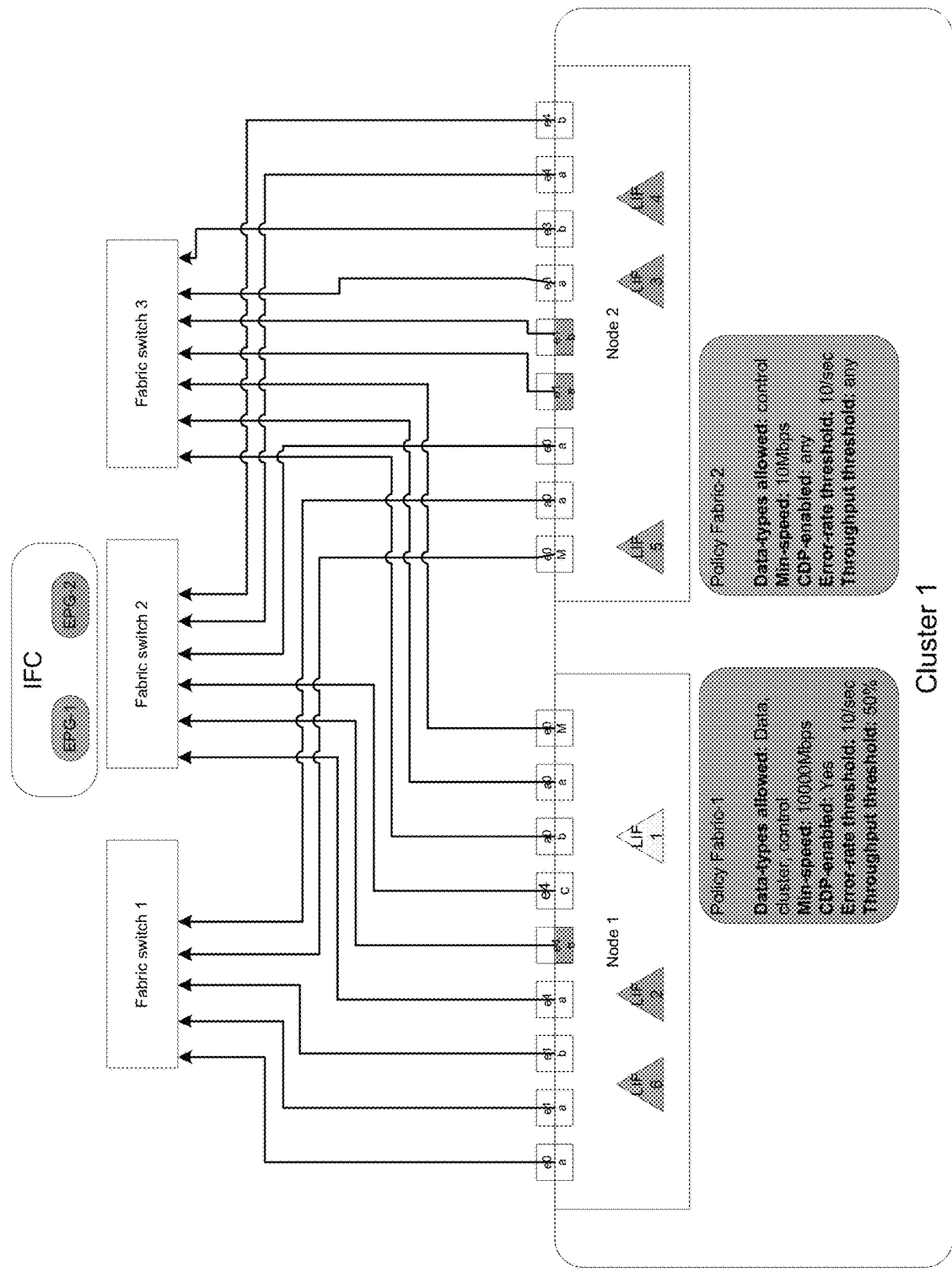
FIG. 11 is a schematic diagram illustrating a fabric network topology, consistent with various embodiments.

To enable this, the process which manages failover policies and failover groups may collect and maintain the iLeaf characteristic for each port within each failover group. The process which manages failover policies and failover groups will also need access to the average throughput of LIFs in order to calculate the throughput for a given port. FIG. 10 illustrates this process.

Potential for Further Enhancements
New failover conditions
Port exceeds load exceeds maximum load threshold AND other port available which would not exceed maximum load threshold if LIF migrated to it
Load measured by LIF throughput avg over some duration Policy-Based Failover Groups and Dynamic Failover and LIF Migration If a port hosting one or more logical interfaces (LIFs) experiences outage conditions, the LIF(s) on that port will also experience an outage.

Failover groups and failover policies are currently implemented in NetApp®'s Clustered Data OnTap® (cDOT) to provide additional LIF resiliency during outage conditions.

Currently in cDOT, the failover policies are: nextavail, priority, disabled.

Nextavail—LIF fails over to the next available port, preferring a port on the current node
Priority—LIF fails over to the next available port as specified in the user-defined failover group
Disabled—a LIF does not fail over Failover groups are lists of ports. A single failover group can be assigned to a LIF at any given time.

Failover occurs in the following scenarios:
Power failure
Automatic revert is enabled on a LIF and that LIF's home port reverts to the administrative up status The port hosting a LIF changes to the administrative down status Node reboot or node out of quorum In a fabric enabled network, the a fabric controller (IFC) has better insight into network traffic patterns than the end points. As a result, the fabric can better inform an end point as to which physical port should be used for a particular set of traffic. In a failover scenario, the IFC can tell a NetApp® cluster end point which node and port should be used to provide the best overall balance, security, or performance within the fabric.

The technology will enable this by establishing fabric policies. Fabric policies will contain ports and characteristics/thresholds. Ports in a cluster may belong to multiple policy groups. LIFs can be added to fabric policies rather than specific ports. The IFC will negotiate with the cluster the port to which a LIF will belong at LIF creation time. The IFC will negotiate and update the failover port priority for a given LIF with the cluster. The IFC can request that a cluster migrate a LIF from one port within a given policy to another port within a given policy given that an IFC can "know" a NetApp fabric policy, can create a relationship between the ports of a given end point group and the ports of a given NetApp fabric policy, "knows" about the existence of NetApp LIFs, and can knows the relationship between a NetApp fabric policy and the LIFs controlled by that policy.

Traditional LIFs, failover groups, and failover policies can still exist. LIFs which belong to fabric policies cannot have traditional failover groups or failover policies Concerns: the fabric may choose a node and port which creates and indirect storage access path. An indirect storage access path is defined as any path in which storage data access requests must traverse a cluster LIF.

Those skilled in the art will appreciate that logic illustrated in flow diagrams and described above may be altered in various ways. For example, the order of the logic may be rearranged, substeps may be performed in parallel, illustrated logic may be omitted, other logic may be included, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

What is claimed is:

1. A method comprising:
   communicating, by a network interface of a storage controller, a plurality of load balancing schemes to a network device communicating with the network interface via a plurality of network links, the plurality of network links coupled to a plurality of ports of the network device and to a plurality of ports of the network interface, the plurality of network links operating in parallel as a logical aggregate link,
   wherein each load balancing scheme is associated with a rule that indicates to the network device when to select a load balancing scheme;
   receiving, by the network interface, notification of a dynamically selected, first load balancing scheme from the plurality of load balancing schemes by the network device, based on a rule associated with the first load balancing scheme and a network condition detected by the network device;
   adjusting, by the network interface, a load balancing scheme used by the network interface to transmit data to the network device for a virtual machine executed by a computing device that interfaces with the network device;
   and
   dynamically modifying the adjusted load balancing scheme used by the network interface, in response to a notification from the network device of congestion detected at a first port of the network device coupled to a first link from the plurality of network links, and a second load balancing scheme selected by the network device, in response to the detected congestion; and
   excluding, by the network interface, a port of the network interface connected to the first port by the first link to transmit data to the network device, upon synchronizing the modified adjusted load balancing scheme with the second load balancing scheme of the network device.

2. The method of claim 1, wherein the virtual machine uses a virtual data storage component presented by the storage controller to store and retrieve data using the storage controller and the network device.

3. The method of claim 1, further comprising: assigning, by the storage controller, different destination media access control (MAC) addresses for different virtual data storage components accessed by different virtual machines via a unique Internet Protocol (IP) address.

4. The method of claim 3, further comprising: utilizing, by the storage controller, the assigned destination MAC addresses for load balancing network traffic from the network interface across the plurality of network links.

5. The method of claim 1, further comprising: utilizing, by the storage controller, a logical unit identifier for a logical object to distribute network traffic from the network interface across the plurality of links, the logical object being accessed by the virtual machine via the network device.

6. The method of claim 1, further comprising: utilizing, by the storage controller, a virtual machine identifier that identifies the virtual machine to load balance network traffic from the network interface across the plurality of links.

7. The method of claim 1, wherein a programmable interface between the network device and the network interface communicates the plurality of load balancing schemes to the network device and the first load balancing scheme to the storage controller.

8. A non-transitory machine-readable storage medium having stored thereon instructions for performing a method, comprising machine executable code which when executed by at least one machine, causes the machine to:
   communicate, by a network interface of a storage controller a plurality of load balancing schemes to a network device communicating with the network interface via a plurality of network links, the plurality of network links coupled to a plurality of ports of the network device and to a plurality of ports of the network interface, the plurality of network links operating in parallel as a logical aggregate link,
   wherein each load balancing scheme is associated with a rule that indicates to the network device when to select a load balancing scheme;
   receive, by the network interface, notification of a dynamically selected, first load balancing scheme from the plurality of load balancing schemes by the network device, based on a rule associated with the first load balancing scheme and a network condition detected by the network device;

adjust, by the network interface, a load balancing scheme used by the network interface to transmit data to the network device for a computing device that interfaces with the network device;
and
dynamically modify the adjusted load balancing scheme used by the network interface, in response to a notification from the network device of congestion detected at a first port of the network device coupled to a first link from the plurality of network links, and a second load balancing scheme selected by the network device, in response to the detected congestion; and
exclude, by the network interface, a port of the network interface connected to the first port by the first link to transmit data to the network device, upon synchronizing the modified adjusted load balancing scheme with the second load balancing scheme of the network device.

9. The non-transitory machine-readable storage medium of claim 8, wherein the network interface transmits data for a virtual machine executed by the computing device, the virtual machine uses a virtual data storage component presented by the storage controller to store and retrieve data using the storage controller and the network device.

10. The non-transitory machine-readable storage medium of claim 9, wherein the storage controller assigns different destination media access control (MAC) addresses for different virtual data storage components accessed by different virtual machines via a unique Internet Protocol (IP) address.

11. The non-transitory machine-readable storage medium of claim 10, wherein the storage controller uses the assigned destination MAC addresses for load balancing network traffic across the plurality of network links.

12. The non-transitory machine-readable storage medium of claim 9, wherein the storage controller uses a logical unit identifier for a logical object to distribute network traffic across the plurality of links, the logical object being accessed by the virtual machine via the network device.

13. The non-transitory machine-readable storage medium of claim 9, wherein network traffic load is balanced across the plurality of links based on a virtual machine identifier that identifies the virtual machine.

14. The non-transitory machine-readable storage medium of claim 8, wherein a programmable interface between the network device and the network interface communicates the plurality of load balancing schemes to the network device and the first load balancing scheme to the storage controller.

15. A system, comprising:
a memory containing machine readable medium comprising machine executable code having stored thereon instructions; and a processor module coupled to the memory, the processor configured to execute the machine executable code to:
communicate, by a network interface of a storage controller, a plurality of load balancing schemes to a network device communicating with the network interface via a plurality of network links, the plurality of network links coupled to a plurality of ports of the network device and to a plurality of ports of the network interface, the plurality of network links operating in parallel as a logical aggregate link,
wherein each load balancing scheme is associated with a rule that indicates to the network device when to select a load balancing scheme;
receive, by the network interface, notification of a dynamically selected, first load balancing scheme from the plurality of load balancing schemes by the network device, based on a rule associated with the first load balancing scheme and a network condition detected by the network device;
adjust, by the network interface, a load balancing scheme used by the network interface to transmit data to the network device for a computing device that interfaces with the network device;
and
dynamically modify the adjusted load balancing scheme used by the network interface, in response to a notification from the network device of congestion detected at a first port of the network device coupled to a first link from the plurality of network links, and a second load balancing scheme selected by the network device, in response to the detected congestion; and
exclude, by the network interface, a port of the network interface connected to the first port by the first link to transmit data to the network device, upon synchronizing the modified adjusted load balancing scheme with the second load balancing scheme of the network device.

16. The system of claim 15, wherein the network interface transmits data for a virtual machine executed by the computing device, the virtual machine uses a virtual data storage component presented by the storage controller to store and retrieve data using the storage controller and the network device.

17. The system of claim 16, wherein the storage controller assigns different destination media access control (MAC) addresses for different virtual data storage components accessed by different virtual machines via a unique Internet Protocol (IP) address.

18. The system of claim 17, wherein the storage controller uses the assigned destination MAC addresses for load balancing network traffic across the plurality of network links.

19. The system of claim 16, wherein the storage controller uses a logical unit identifier for a logical object to distribute network traffic across the plurality of links, the logical object being accessed by the virtual machine via the network device.

20. The system of claim 16, wherein network traffic load is balanced across the plurality of links based on a virtual machine identifier that identifies the virtual machine.

21. The system of claim 15, wherein a programmable interface between the network device and the network interface communicates the plurality of load balancing schemes to the network device and the first load balancing scheme to the storage controller.

* * * * *